United States Patent [19]

Trubiano

[11] Patent Number: 5,553,876
[45] Date of Patent: Sep. 10, 1996

[54] NESTABLE SHOPPING CART WITH IMPROVED LOWER CONTAINMENT MEANS

[75] Inventor: Antoine Trubiano, Montreal, Canada

[73] Assignee: Cari-All Inc., Montreal, Canada

[21] Appl. No.: 392,189

[22] Filed: Feb. 22, 1995

[51] Int. Cl.[6] ........................................... B62B 3/14
[52] U.S. Cl. ...................... 280/33.991; 280/33.992; 280/DIG. 4; 224/411
[58] Field of Search ................ 280/33.991, 33.992, 280/33.993, 33.995, 33.996, 33.997, 47.34, 47.35, DIG. 3, DIG. 4; 224/411; 248/218.4, 311.2; 220/491, 743

[56] References Cited

U.S. PATENT DOCUMENTS

| 3,026,122 | 3/1962 | Young | 280/33.995 |
|---|---|---|---|
| 3,245,498 | 4/1966 | Stanley et al. | 280/33.995 |
| 3,361,438 | 1/1968 | Davis | 280/33.991 |
| 3,503,622 | 3/1970 | Romero | 280/33.993 |
| 3,614,133 | 10/1971 | Ganci | 280/33.991 |
| 3,645,554 | 2/1972 | Von Stein et al. | 280/33.991 |
| 3,717,358 | 2/1973 | Mills | 280/33.991 |
| 3,751,059 | 8/1973 | Dunder et al. | |
| 3,813,111 | 5/1974 | Ruger | 280/33.991 |
| 3,912,291 | 10/1975 | Frisch | 280/33.992 |
| 4,123,077 | 10/1978 | Joseph | 280/33.991 |

FOREIGN PATENT DOCUMENTS

| 2-155868 | 6/1990 | Japan | 280/33.995 |
|---|---|---|---|

Primary Examiner—Brian L. Johnson
Assistant Examiner—Min Yu
Attorney, Agent, or Firm—Carter & Schnedler

[57] ABSTRACT

A nestable shopping cart is comprised of a main containment basket supported elevated by a frame which is displaceable on casters. A handle bar is secured rearwardly spaced from a rear wall of the basket by spaced side attachment members at opposed ends thereof. A restraining open area is defined between the rear wall of the shopping basket, the handle bar and the space side attachment members. A secondary containment basket is secured between a pair of rear frame members in a lower section of the frame and has at least a portion of a top open end thereof aligned substantially on a vertical axis passing through the restraining open area. The secondary basket is secured spaced inwardly of the pair of rear frame members by nesting support brackets.

9 Claims, 5 Drawing Sheets

5,553,876

NESTABLE SHOPPING CART WITH IMPROVED LOWER CONTAINMENT MEANS

TECHNICAL FIELD

The present invention relates to a nestable shopping cart having an improved lower containment means whereby elongated objects may be supported in a secondary containment basket supported in a lower section of the shopping cart and in line with a restraining open area defined between the rear wall of the main containment basket, the handle bar and spaced side attachment members of the handle bar with the elongated objects passing through the restraining open area whereby to maintain the objects substantially vertically in a restrained manner within the confines of the cart.

BACKGROUND ART

Shopping carts have been provided with a containment means in a lower part of the frame and such containment means is usually provided by a support meshing extending between opposed side frame members to which the casters are secured directly under the bottom wall of the containment basket. A typical example of such lower support frame is shown in U.S. Pat. No. 3,751,059 which relates to an over-the-counter shopping cart. It is pointed out that it has not been feasible to provide a lower container whereby more products may be retained by the shopping cart as most carts are made to nest within one another, when not in use, and as also illustrated in the above reference U.S. patent, and a lower basket would prevent the nesting. By providing a lower flat frame as shown in the above-referenced patent, the shopping carts can still be nested.

With the advent of large warehouse-type shopping stores, it is now common to purchase large objects in such warehouse-type but a disadvantage has been to carry elongated size objects by conventional shopping cart. For this reason, some of these warehouse outlets provide dollies which is merely a rectangular pallet supported on wheels and being displaced by a large U-shaped vertical handle bar in the rear thereof. A disadvantage of these pallets is that they are very large and cannot be nested and occupy a lot of space in the aisles and consequently these must be stored outside the stores and this causes several secondary problems such as the pallets being left stranded in the parking areas causing damage to automobiles, they can be stolen and also cause injuries to people's legs and anckles, etc.

Another disadvantage of the conventional shopping cart, when used in these warehouse-type stores is that elongated objects of irregular sizes, such as garden tools, i.e. shovels, rakes, etc. or any elongated object is usually placed into the basket and protrude outwardly thereof from the sides rear or front causing injuries to customers and causes damage to goods stored in shelving along the sides of the aisles through which these shopping carts are displaced.

DISCLOSURE OF THE INVENTION

It is therefore a feature of the present invention to provide a nestable shopping cart having a main containment basket as well as a secondary containment basket which has its open top end aligned, at least in part, with a restraining open area defined between the rear wall of the main containment basket, the handle bar and spaced side attachment members so that elongated objects may be supported substantially vertically in the lower containment basket with a portion of the object extending through the restraining open area whereby the object is supported in a vertical orientation, rearwardly of the basket and in a manner which will not cause damage and wherein such containment means further permits nestable shopping cart to carry more objects than heretofore possible while still permitting nesting.

According to the above features, from a broad aspect, the present invention provides a nestable shopping cart comprising a main containment basket supported elevated by a frame. Casters are secured to the frame to displace the shopping cart on a floor surface. The containment basket has a bottom wall, side walls, a front wall and a rear wall. A handle bar is secured rearwardly spaced from the rear wall by spaced side attachment members at opposed ends thereof. A restraining open area is defined between the rear wall, handle bar and spaced side attachment members. A secondary containment basket is secured between a pair of rear frame members in a lower section of the frame and has at least a portion of a top open end thereof aligned substantially on a vertical axis passing through the restraining open area. The secondary basket is secured spaced inwardly of the pair of rear frame members by nesting support brackets.

BRIEF DESCRIPTION OF DRAWINGS

A preferred embodiment of the present invention will now be described with reference to the accompanying drawings in which.

DESCRIPTION OF PREFERRED EMBODIMENT

Figure 1:
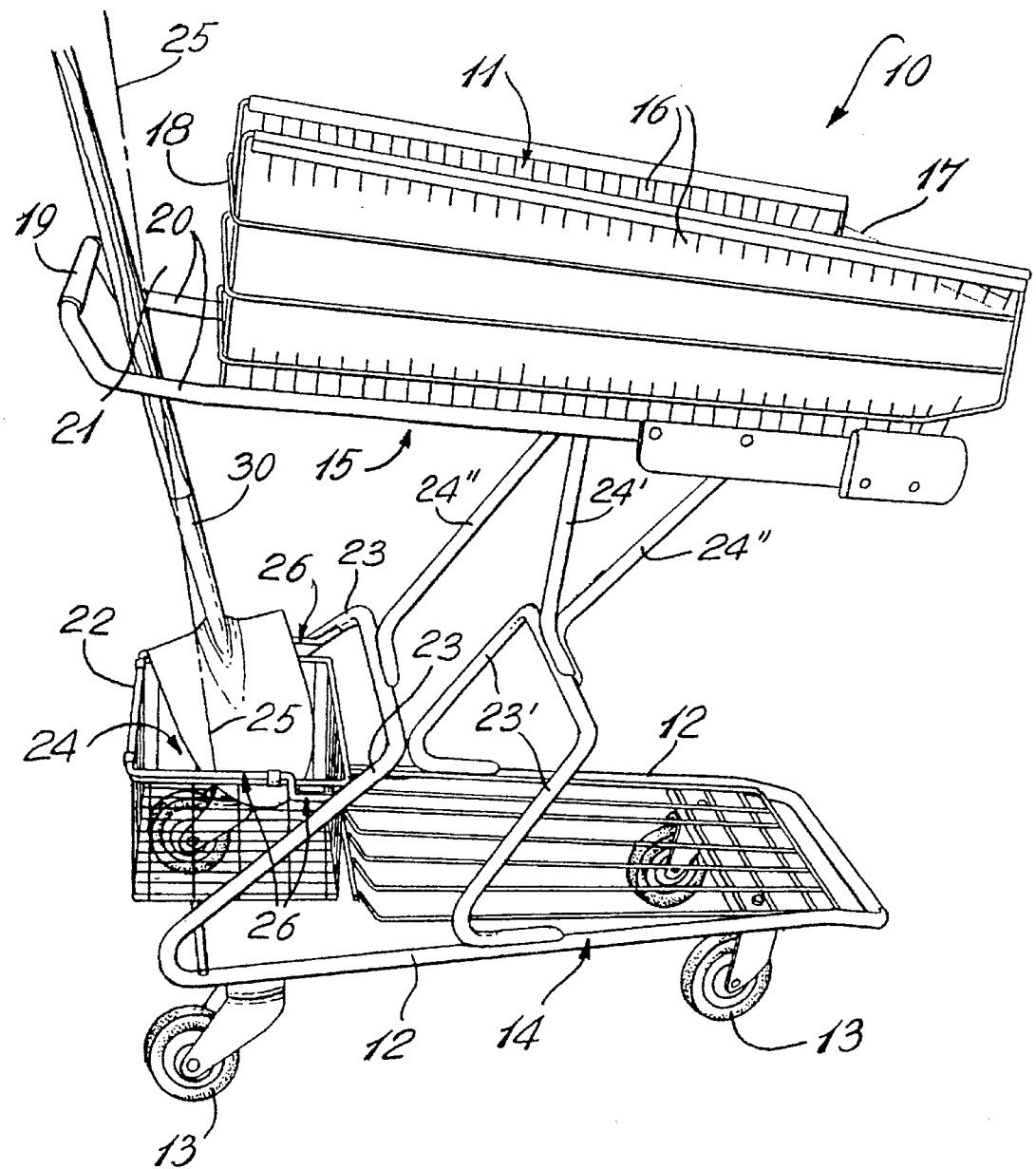
FIG. 1 is a perspective view of an over-the-counter shopping cart having incorporated therein the improved lower containment means of the present invention.
Figure 2:
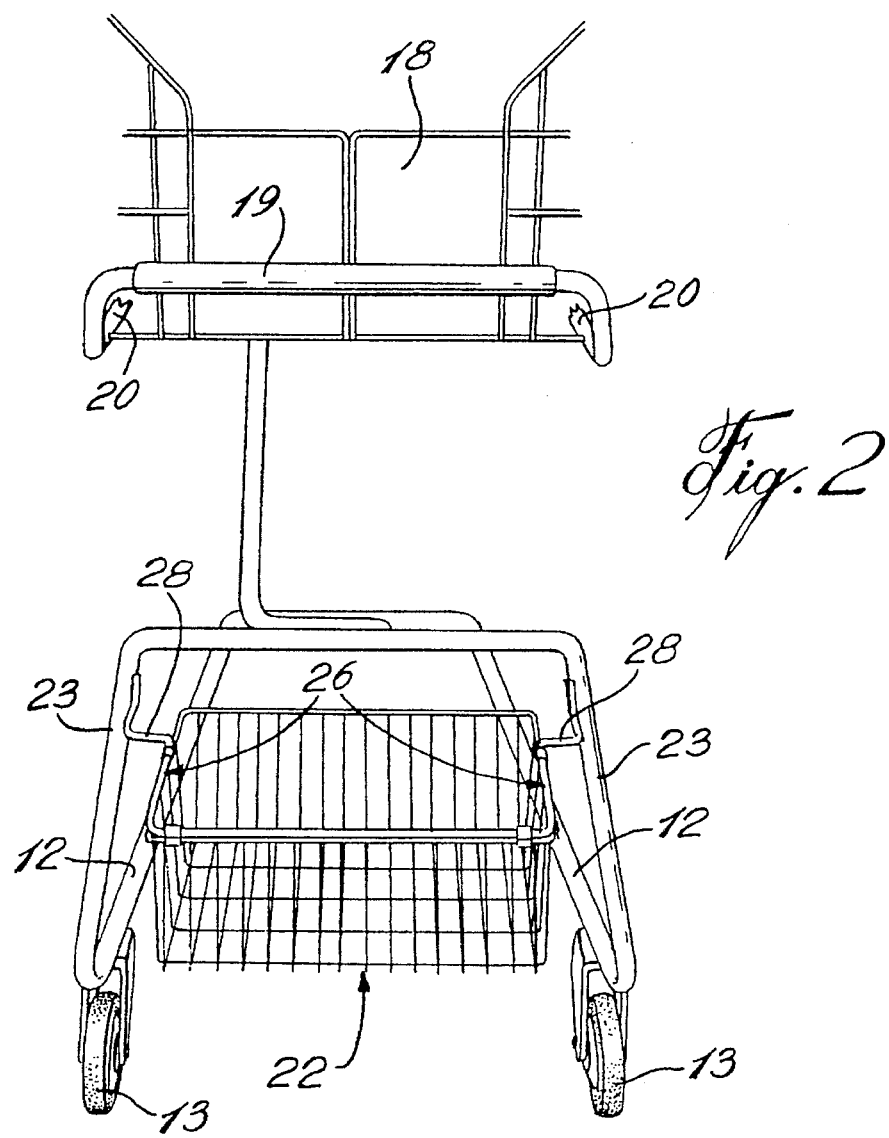
FIG. 2 is a rear view of FIG. 1.
Figure 3:
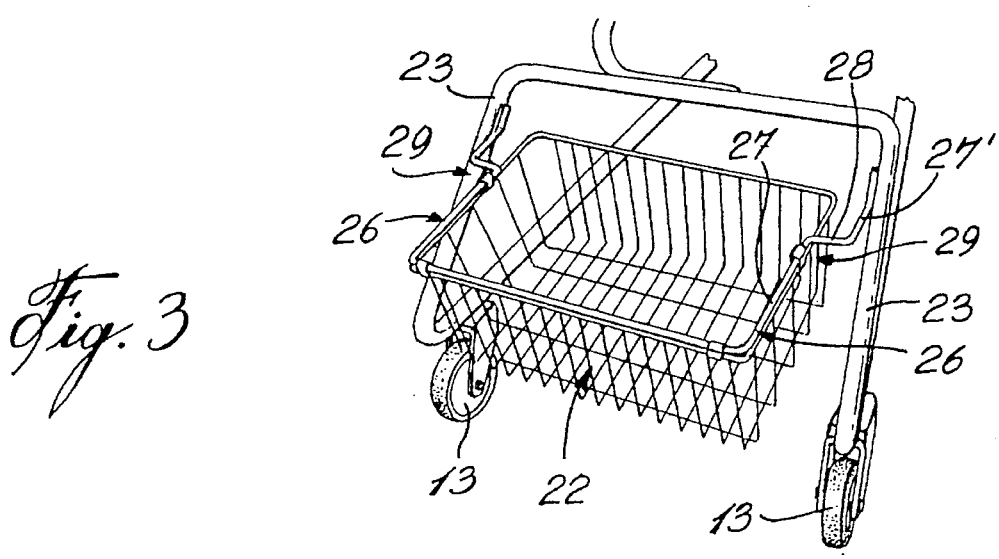
FIG. 3 is a fragmented perspective view showing the manner in which the lower secondary containment basket is secured between a pair of rear frame members.

Referring now to the drawings, and more particularly to FIGS. 1 to 3, there is shown in generally at 10, an over-the-counter nestable shopping cart adapted with the improved lower containment means of the present invention. The shopping cart comprises a main containment basket 11 which is supported elevated by a frame 12 having casters 13 secured thereunder. The lower horizontal part 14 of the frame is substantially rectangular and of approximately the same width and length as the basket 11. The containment basket 11 has a bottom wall 15, side walls 16, a hingeable front wall 17 and a rear wall 18. A handle bar 19 is secured rearwardly spaced from the rear wall 18 by spaced side attachment members 20 which are secured to the frame or the main containment basket and the opposed ends of the handle bar. A restraining open are 21 is defined between the rear wall 18, the handle bar 19 and the spaced side attachment members 20.

The improvement of the shoppping cart resides in that a lower secondary containment basket 22 is secured between a pair of upwardly extending rear frame members 23 in a lower section of the frame and has at least a portion of a top open end 24 of the basket 22 disposed substantially on a vertical axis 25 which passes through the restraining open area 21. The secondary basket 22 is secured spaced inwardly of the pair of rear frame members 23 by nesting support brackets 26.

As can be seen from FIGS. 1 and 2 and previously mentioned, the lower, generally rectangular frame 14, has a length and a width substantially equal to the length and width of the main containment basket 11 whereby to stabilize the main containment basket over a floor support surface. As also shown in these figures, the frame is provided with two pairs of upwardly extending rear frame members 23 and 23' with a forward most one these pairs being secured to the lower rectangular frame 14 at substantially mid-length by a vertical tubular member 24' of the frame to provide added support of the main carrying basket 11. These pairs of rear frame members 23 and 23' are generally U-shaped members and have an angled support tubular member 24" and extend upwardly outwardly to connect the basket support frame to the lower frame 14.

As shown in FIG. 3, the nestable support brackets 26 have a pair of attachment members 27 and 27' disposed spaced in parallel planes and interconnected by an integral intermediate bridge member 28. A nesting space 29 is defined between the pair of attachment members 27 and 27' for receiving therein a respective one of the upwardly extending frame members 23 of another shopping cart nested therewith. The nestable support brackets 26 are secured to the rear frame members 23.

As shown in FIG. 1, the secondary basket 22 and the restraining open area 21, aligned therewith, are adapted to retain elongated objects, such as the shovel 30, brooms, pipes, etc., whereby one end of the objects, herein the shovel 30, is placed in the secondary basket 22 with the other end extending through the open area and being contained by the restraining open area in a substantially vertical orientation thereby not causing obstruction outside the confines of the shopping basket.

Figure 4:
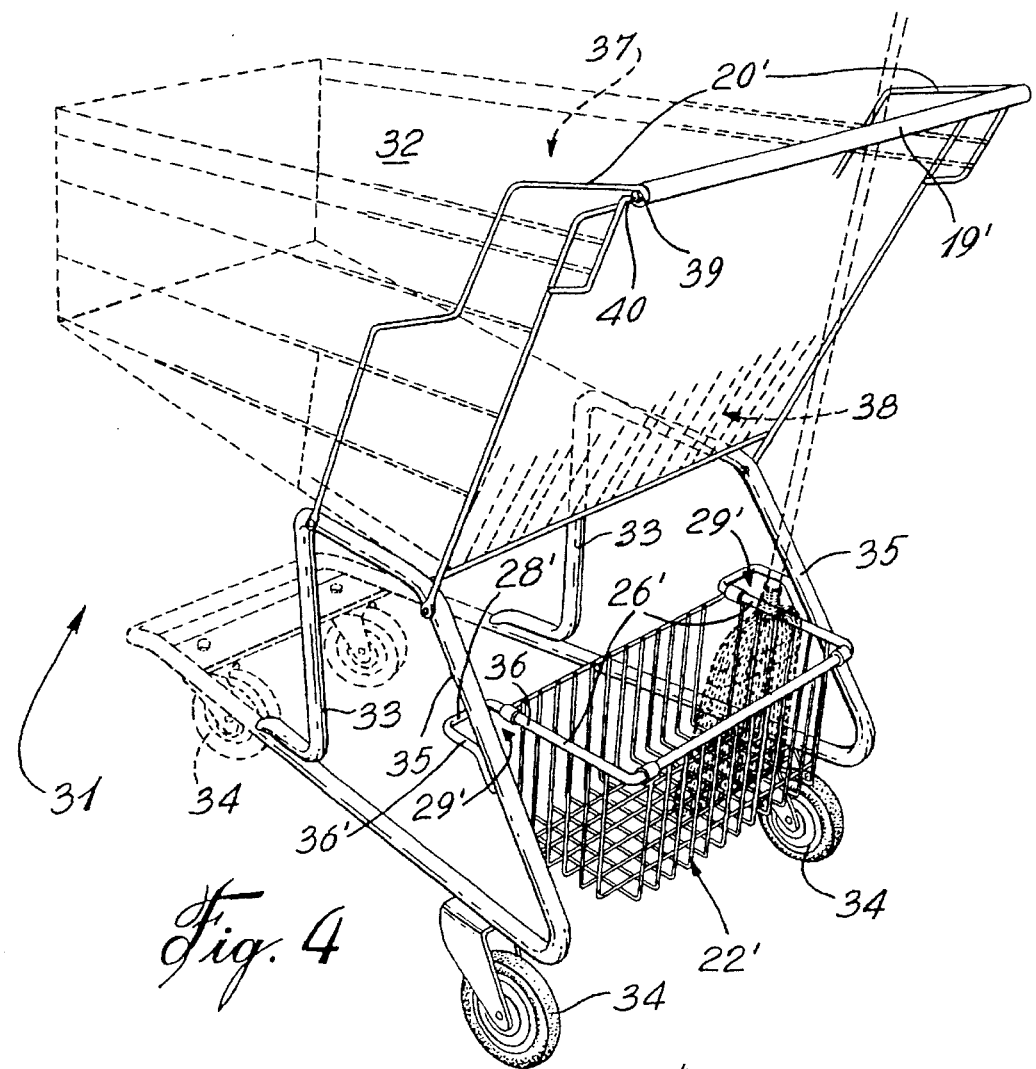
FIG. 4 is a perspective view showing a lower secondary containment basket secured to the frame of a conventional nestable shopping cart.
Figure 5:
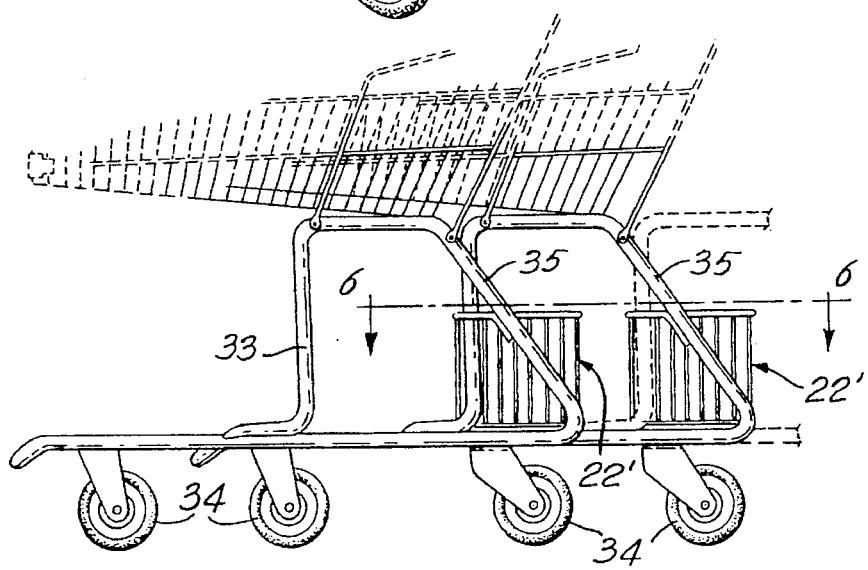
FIG. 5 is a side view showing the nesting of the cart of FIG. 4.
Figure 6:
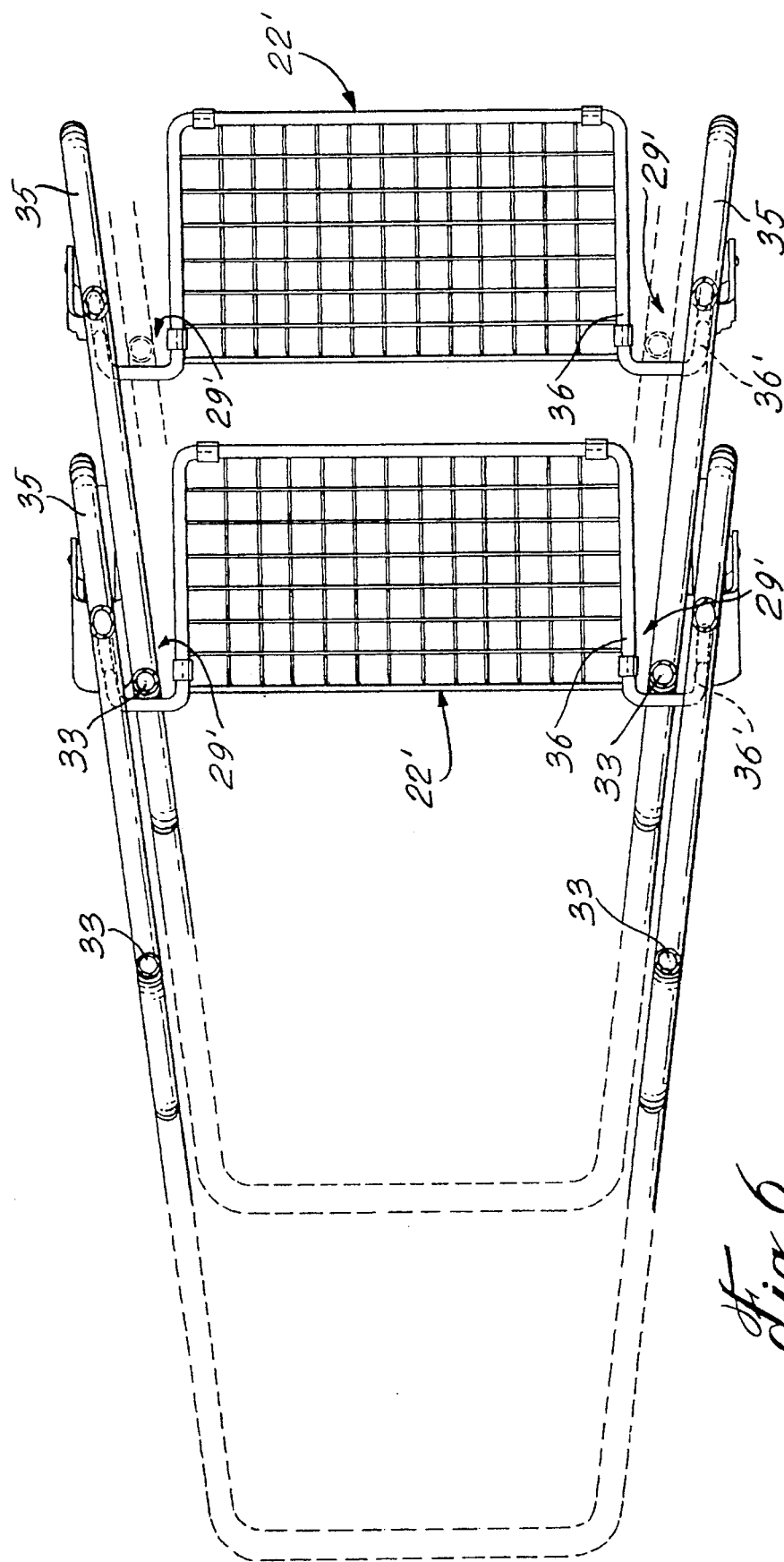
FIG. 6 is a top view along section IV of FIG. 5.

Referring now to FIGS. 4 to 6, there is shown a conventional shopping cart 31 having a main containment basket 32 supported elevated by a frame 33 supported on casters 34 and wherein the lower secondary basket 22' is secured to the pair of upwardly extending rear frame members 35 by nesting support brackets 26'. The nesting support brackets have a U-shaped assembly formed by a pair of attachment members 36 and 36' interconnected by an integral intermediate bridge member 28', and a nesting space 29' is defined between the attachment members 36 and 36', respectively. When the baskets of these types are nested together, as shown in FIGS. 5 and 6, the front tubular frame member 33 is received within the nesting space 29'.

As also shown in FIG. 4, the spaced side attachment members 20' which secure the handle bar 19' are formed of rigid metal wires which are secured to the side walls 37 of the containment basket 32 by welding and these wire members 20' extend rearwardly of the rear wall 38 and define fastener receiving cavities 39 to receive fasteners 40 therein which are secured in the ends of the handle bar 19'.

As shown in FIG. 1, the spaced side attachment members 20 are formed by opposed side arms of a tubular member which is integrally formed with the handle bar, the handle constituting an intermediate arm section thereof. The side arms 20 are secured to the frame or integrally formed therewith and may also be secured to the bottom wall 15 of the containment basket 11 by welding or by brackets (not shown).

Figure 7:
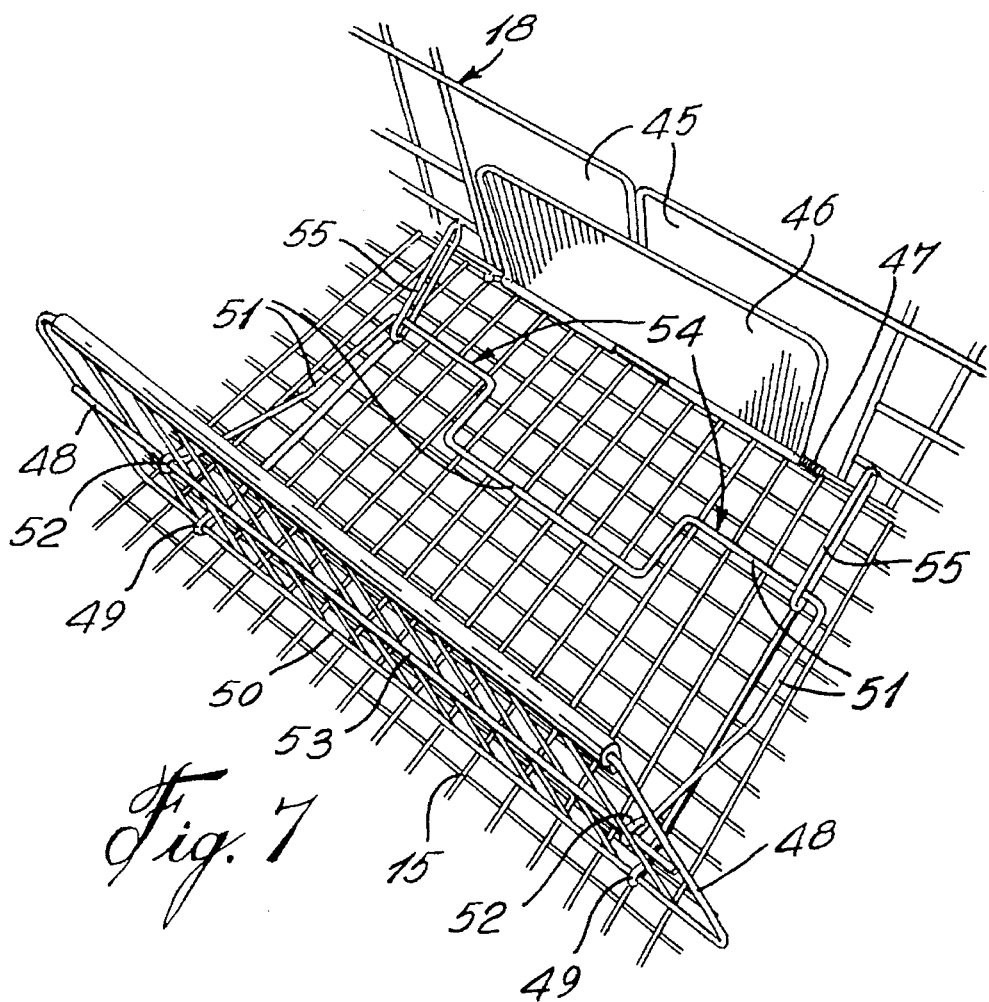
FIG. 7 is a fragmented perspective view showing the construction of a collapsible back rest frame which co-act with a seat plate to obstruct leg holes in a rear of a shopping cart.
Figure 8:
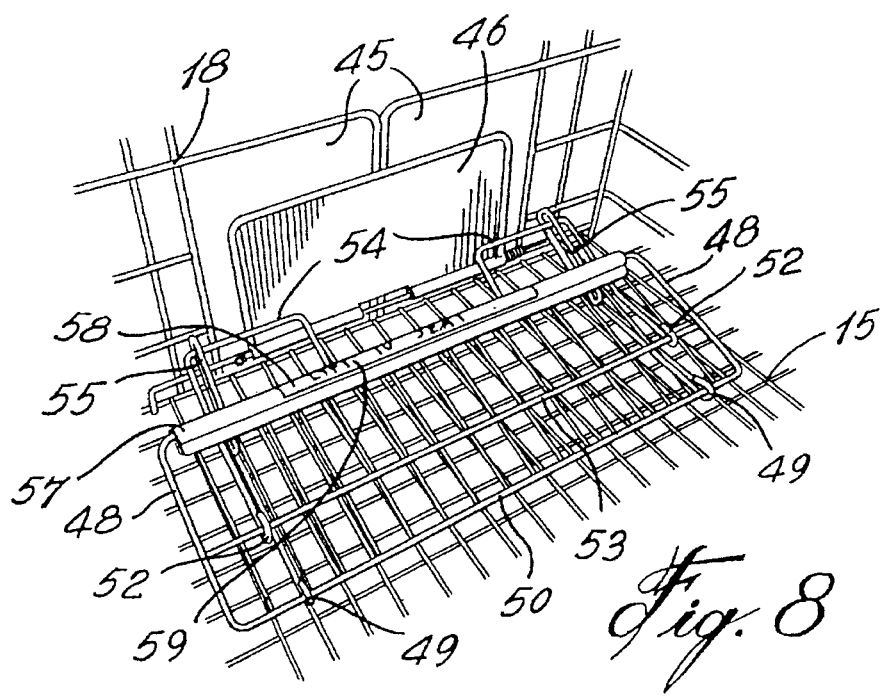
FIG. 8 is a perspective view similar to FIG. 7 but showing the back rest in a collapsed position to maintain the seat plate immovable against the leg holes of the rear wall.

Referring now to FIGS. 7 and 8, there is shown the construction of the rear wall 18 of the containment basket 11 of the over-the-counter shopping cart 10 as shown in FIG. 1. As can be seen the containment basket has a pair of leg holes 45 and a seat plate 46 is pivotally secured internally of the containment basket adjacent the rear wall and is spring-biased by a helical spring(s) 47 against the leg holes 46 to obstruct these holes to prevent merchandise from falling out of the main containment basket through the leg holes 45 when the baby seat containment does not support a child. A collapsible back rest 48 is hinged at a bottom end by loop rod ends 49 to wires 50 forming the bottom wall 15 of the basket. Attachment means in the form of a bent wire 51 is pivotally secured at a bent end 52 to a horizontal wire 53 in the back rest 48 and forms a pair of shoulder portions 54 which are slidingly received in a respective one of wired guide loops 55 angularly secured between the back wall 45 and the bottom wall 15. Such a mechanism is shown in the above-referenced U.S. Patent.

As can be seen in FIG. 8, when the back rest 48 is collapsed rearwardly towards the back wall 18, the shoulder portions 54 will slide up into the guide slots 55 and cause the shoulder portions 54 to abut against the seat plate 46 thereby preventing the seat plate from being pushed inwardly of the basket. This provides for maximum carrying capacity of the main containment basket while providing the added safety feature of positively blocking the leg holes 45 to prevent products from falling out of the main carrying basket.

As also shown in FIG. 8, a plastic edge plate 58 is secured on the top edge 57 of the back rest and has an inscription thereon, such as shown at 59, to inform the user to lift the back rest 48 in order to form a baby seat compartment 59, as shown in FIG. 7, to place a child seated in the rear end of the shopping cart on the seat plate 46, which is hinged downwardly against the spring action 47 to positioned a child thereon with his legs extending through the leg holes 45. When the carts are nested, the back rest automatically falls down to provide maximum space in the shopping basket.

As can be seen that, even if a child is seated in the rear end of the basket, there is still sufficient space provided by the open area 21 whereby to permit the passage of elongated objects to each side of the leg holes and in an unobstructing manner to the child. The larger part of such elongated object would be placed in the lower containment basket 22 and only the least obstructive part would extend next to the child, not to endanger the child.

It is within the ambit of the present invention to cover any obvious modifications of the preferred embodiment described therein, provided such modifications fall within the scope of the appended claims.

I claim:

1. A nestable shopping cart comprising a main containment basket supported elevated by a frame, casters secured to said frame to displace said shopping cart on a floor surface; said containment basket having a bottom wall, side walls, a front wall and a rear wall; a handle bar secured rearwardly spaced from said rear wall by spaced side attachments members at opposed ends thereof; a restraining open area defined between said rear wall, handle bar and a spaced side attachment members; a lower secondary containment basket secured between a pair of upwardly extending rear frame members in a lower section of said frame and having at least a portion of a top open end thereof aligned substantially on a vertical axis passing through said restraining open area, said secondary basket and said restraining open area being dimensioned to position and retain elongated objects supported in said secondary basket and extending through said restraining open area whereby said object is transported substantially upright by said shopping cart in a rear portion thereof and within the containment space of said restraining open area, said secondary basket being secured and spaced inwardly of said pair of rear frame members by nesting support brackets, said nesting support brackets having a pair of attachment members disposed and spaced in parallel vertical planes running longitudinally along said cart and interconnected by an integral intermediate bridge member, a nesting space defined between said vertical planes for receiving therein a respective one of a pair of frame members of another shopping cart.

2. A nestable shopping cart as claimed in claim 1 wherein said frame members are a pair of forward frame members of an over-the-counter shopping cart.

3. A nestable shopping cart as claimed in claim 1 wherein said attachment members combined with the bridge member to form U-shaped members and the nesting space is defined between the attachment members, bridge member and a portion of one of said rear frame members.

4. A nestable shopping cart as claimed in claim 1 wherein said nesting space is defined between one of said attachment members and a portion of one of said rear frame members.

5. A nestable shopping cart as claimed in claim 1 wherein said spaced attachment members are metal wire members secured to said containment basket and extending rearwardly of said rear wall to define fastener receiving cavities through which fasteners are disposed and engage in a respective end of said handle bar to removably secure said handle bar between said cavities.

6. A nestable shopping cart as claimed in claim 1 wherein said spaced attachment members are formed by opposed side arms integrally formed in a tubular member, said tubular member having an intermediate arm section forming said handle bar, said side arms being secured to said frame and said bottom wall of said containment basket.

7. A nestable shopping cart as claimed in claim 2 wherein said rear wall of said containment basket has a pair of leg holes wherein a seat plate pivotally secured internally of said containment basket and spring biased against said leg holes, a collapsible back rest frame hinged to said basket bottom wall, attachment means pivotally secured to said back rest frame and having a pair of shoulder portions restrained by guide means for positioning said shoulder portion against said seat plate when said back rest is collapsed rearwardly towards said rear wall to render said seat plate inoperable and securely obstruct said leg holes.

8. A nestable shopping cart as claimed in claim 2 wherein said frame has a lower, generally rectangular horizontal frame portion having a length and a width substantially equal to the length and width of said main containment basket.

9. A nestable shopping cart as claimed in claim 8 wherein there is provided two pairs of upwardly extending rear frame members, one of said pair being secured to said lower rectangular horizontal frame at substantially mid-length thereof to provide added support and stability to said main containment basket.

* * * * *